(12) United States Patent
Wu

(10) Patent No.: US 6,349,948 B1
(45) Date of Patent: Feb. 26, 2002

(54) UNIVERSAL BIT ADAPTER

(76) Inventor: Kuei-Fu Wu, 5F, No. 453, Ming-Sui Road, Shung-San District, Taipei (TW)

( * ) Notice: Subject to any disclaimer, the term of this patent is extended or adjusted under 35 U.S.C. 154(b) by 0 days.

(21) Appl. No.: 09/833,120

(22) Filed: Apr. 10, 2001

(30) Foreign Application Priority Data

May 1, 2000 (TW) ........................................ 89207152 U

(51) Int. Cl.$^7$ ................................................ B23B 31/03
(52) U.S. Cl. ........................ 279/77; 279/143; 279/907
(58) Field of Search ............................. 279/29, 77, 78, 279/143, 145, 904, 907; 408/239 A

(56) References Cited

U.S. PATENT DOCUMENTS

| | | | | |
|---|---|---|---|---|
| 87,715 A | * | 9/1869 | Sible | 279/77 |
| 836,303 A | * | 11/1906 | Christensen | 279/29 |
| 1,031,914 A | * | 7/1912 | Clouse | 279/29 |
| 3,599,765 A | * | 8/1971 | Turner, III et al. | 279/145 |
| 5,398,946 A | * | 3/1995 | Quiring | 279/145 |
| 5,722,805 A | * | 3/1998 | Giffin | 279/102 |
| 6,059,493 A | * | 5/2000 | Kirn et al. | 279/78 |

* cited by examiner

Primary Examiner—Steven C. Bishop

(57) ABSTRACT

A universal bit adapter includes: an adapting member clamped in a chuck or spindle of a tool having a shank hole longitudinally formed in the adapting member for inserting a tool bit into the shank hole; a sleeve coupled to a front portion of the adapting member for pivotally mounting a control member in a front portion of the sleeve; and a tension spring resiliently held in the sleeve for tensioning a back portion of the control member for normally biasing the control member to allow an axis of a central hole formed through the control member to be eccentrically inclinedly intersected with a longitudinal axis formed in the shank hole in the adapting member for firmly dogging any shank portion of the tool bit in the central hole in the control member regardless of the positioning of the neck portion as recessed in the shank portion of the tool bit.

4 Claims, 9 Drawing Sheets

UNIVERSAL BIT ADAPTER

BACKGROUND OF THE INVENTION

A conventional bit as shown in FIG. 1 includes a neck portion N recessed in a bit B and engaged by a locking ball L to be locked in an adapter H which is then clamped in a chuck C of a hand tool including an electric drill, a driver, an electrically charging tool, and a pneumatic tool.

However, the neck portion N as recessed in each bit, such as the numerals B, B1, B2, is not located at a constant position on the bit. Each bit should require a corresponding adapter or bit holder for well matching of the bit in the adapter, thereby requiring a plurality of adapters and increasing the installation cost.

Since the neck portion N is generally recessed in a deep portion within the adapter H, a large shank portion of the bit B will protrude outwardly beyond the adapter to cause unstable holding of the bit in the adapter. It also remains an aperture between the neck portion N and the locking ball L, thereby easily loosening the holding of the bit within the adapter.

The present inventor has found the drawbacks of the conventional bit adapter, and invented the present universal bid adapter.

SUMMARY OF THE INVENTION

The object of the present invention is to provide a universal bit adapter including: an adapting member clamped in a chuck or spindle of a tool having a shank hole longitudinally formed in the adapting member for inserting a tool bit into the shank hole; a sleeve coupled to a front portion of the adapting member for pivotally mounting a control member in a front portion of the sleeve; and a tension spring resiliently held in the sleeve for tensioning a back portion of the control member for normally biasing the control member to allow an axis of a central hole formed through the control member to be eccentrically inclinedly intersected with a longitudinal axis formed in the shank hole in the adapting member for firmly dogging any shank portion of the tool bit in the central hole in the control member regardless of the positioning of the neck portion as recessed in the shank portion of the tool bit.

DETAILED DESCRIPTION

As shown in FIGS. 2~7, the present invention comprises: an adapting member 1, a sleeve 2 coupled to a front portion of the adapting member 1, a control member 3 pivotally mounted in the sleeve 2, and a tension spring 4 retained in the sleeve 2 for resiliently holding the control member 3.

The tool bit as used in the present invention includes a driver bit, a drill bit and other tool bits, not limited in the present invention. Also, the bit may be clamped on any tools including electric drill, electric driver, electrically charging tool, pneumatic tool or manual tools.

The tool bit B may be formed as polygonal shape such as hexagonal shape or cylindrical shape, not limited in the present invention.

Figure 7:
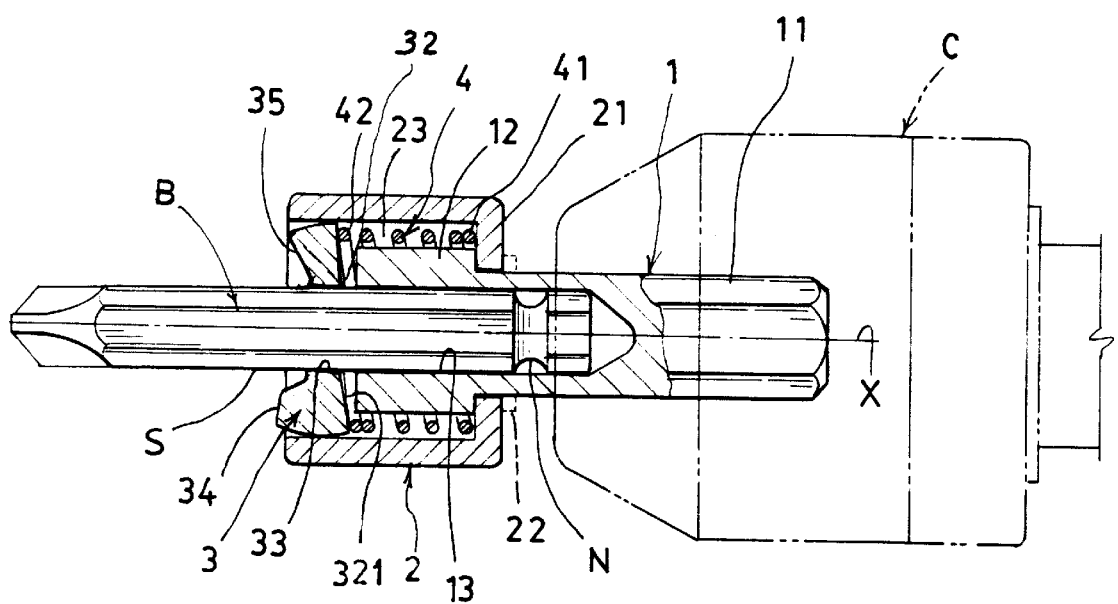
FIG. 7 is an illustration having the bit inserted therein.

The adapting member 1 may be integrally formed with the sleeve 2. Or, the sleeve 2 may be assembled or fastened with the adapting member 1 by a retainer 22 as shown in FIG. 7.

The adapting member 1 includes: a rear rod portion 11 clamped or secured in a chuck C or spindle of a tool, a front holding portion 12 formed on a front portion of the rod portion 11, and a shank hole 13 longitudinally recessed in the front holding portion 12 defining a longitudinal axis X in the longitudinal center of the shank hole 13.

The sleeve 2 includes: a rear end plate 21 having a central rod hole 211 formed in the end plate 21 for passing the rear rod portion 11 of the adapting member 1 through the central rod hole 211, a retainer 22 for securing the sleeve 2 on the rear rod portion 11 of the adapting member 1, and a socket (or an interior) 23 formed in a front portion of the sleeve 2 having a front end surface 24 formed on a front end of the socket 23 of the sleeve 2.

Figure 5:
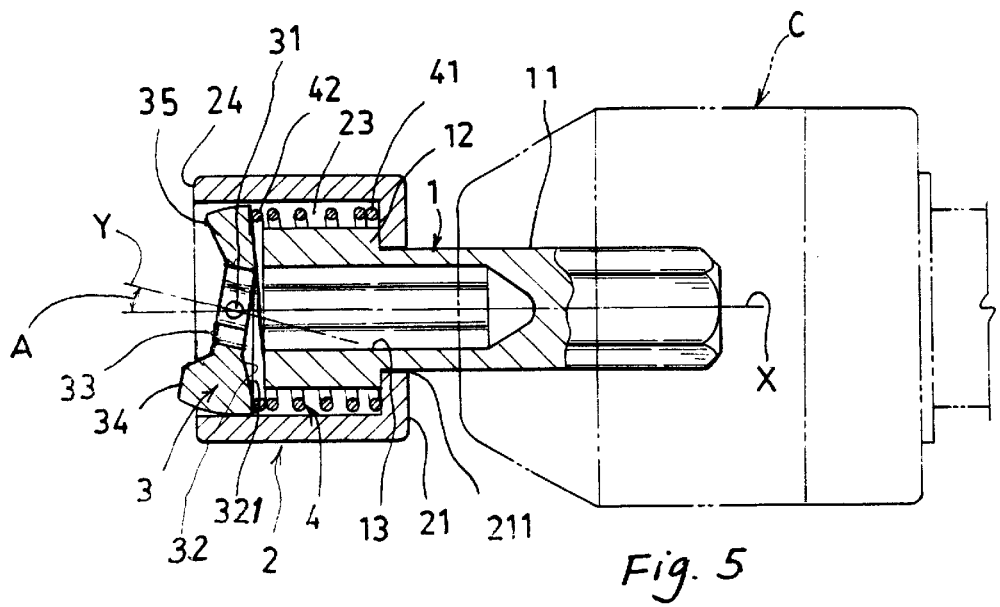
FIG. 5 is a sectional drawing of the present invention before inserting the tool bit therein.

The control member 3 is generally formed as a circular disk and includes: a pivot 31 for pivotally mounting the control member 3 in the socket 23 adjacent to the front end surface 24 of the sleeve 2, a back portion 32 formed on a rear end of the control member 3 to be urged by the tension spring 4 as retained in the sleeve 2, a central hole 33 longitudinally formed through the control member 3 defining an axis Y axially at a center of the central hole 33, with the axis Y of the central hole 33 in the control member 3 being eccentrically inclinedly intersected with the longitudinal axis X in the shank hole 13 of the adapting member 1 with an acute angle A as shown in FIG. 5 when normally urging the back portion 32 of the control member 3 by the tension spring 4, a depressing portion 34 formed on a first peripheral portion of the front portion of the control member 3, and a counter-weight portion 35 formed on a second peripheral portion of the front portion of the control member 3 opposite to the depression portion 34 for dynamically balancing the control member 3 when holding a tool bit therein for a rotation about the longitudinal axis X; with the axis Y in the control member 3 aligned with the longitudinal axis X in the adapting member 1 upon an inward depression on the depression portion 34 of the control member 3.

The central hole 33 in the control member 3 may be formed as a polygonal shape (such as a hexagonal shape) or a cylindrical shape.

The tension spring 4 has its front spring end 42 normally urging the back portion 32 of the control member 3 and having a rear spring end 41 retained on the rear end plate 21 of the sleeve 2.

The back portion 32 of the control member 3 further includes a convex portion 321 protruding rearwardly from a peripheral portion of the back portion 32 opposite to the depression portion 34 of the control member 3 to ensure its resilient contact with the spring 4.

Figure 6:
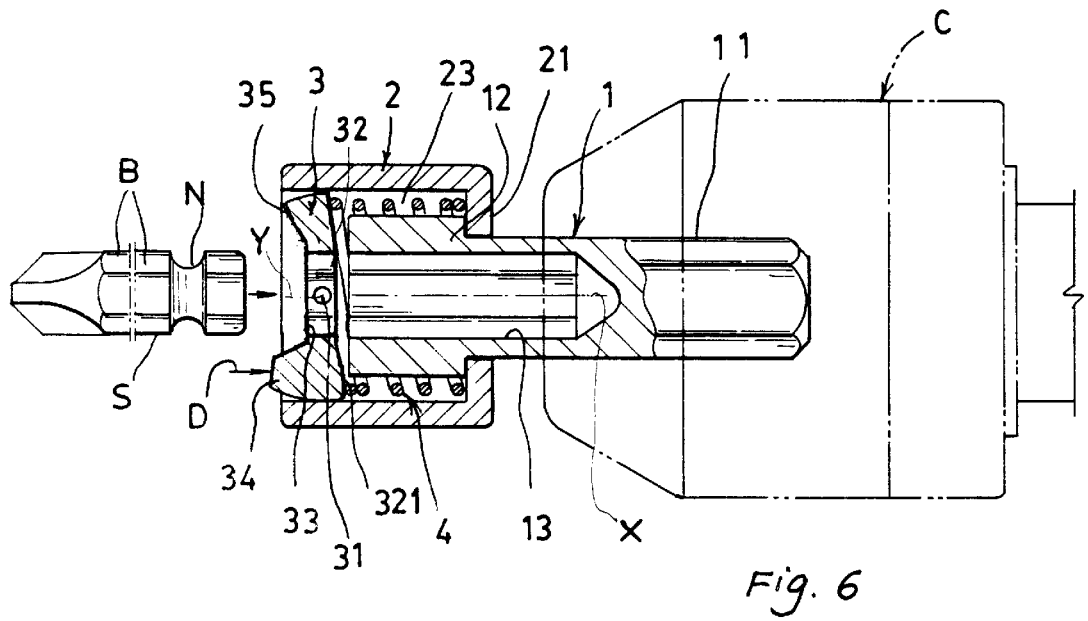
FIG. 6 is an illustration showing the tool bit to be inserted into the present invention.

When the control member 3 is depressed inwardly upon depression on the depression portion 34 as shown in FIG. 6 to align the central hole 33 in the control member 3 with the longitudinal hole 13 in the adapting member 1 (by aligning the axis Y with the longitudinal axis X), a tool bit B such as a driver bit will then be inserted and located into the holes 33, 13 without obstruction.

When releasing the depression on the depression portion 34, the tension spring 4 will urge the control member 3 to be eccentrically biased to firmly dog the shank portion S of the bit B as shown in FIG. 7 for a stable rotation and operation of the tool.

If the tool bit B is intended to be replaced with another bit, the depression portion 34 is further depressed to align the central hole 33 in the control member 3 with the longitudinal hole 13 of the adapting member 1 to allow the withdrawal of the bit B from the holes 33, 13 in order for replacing a new tool bit.

Figure 1:
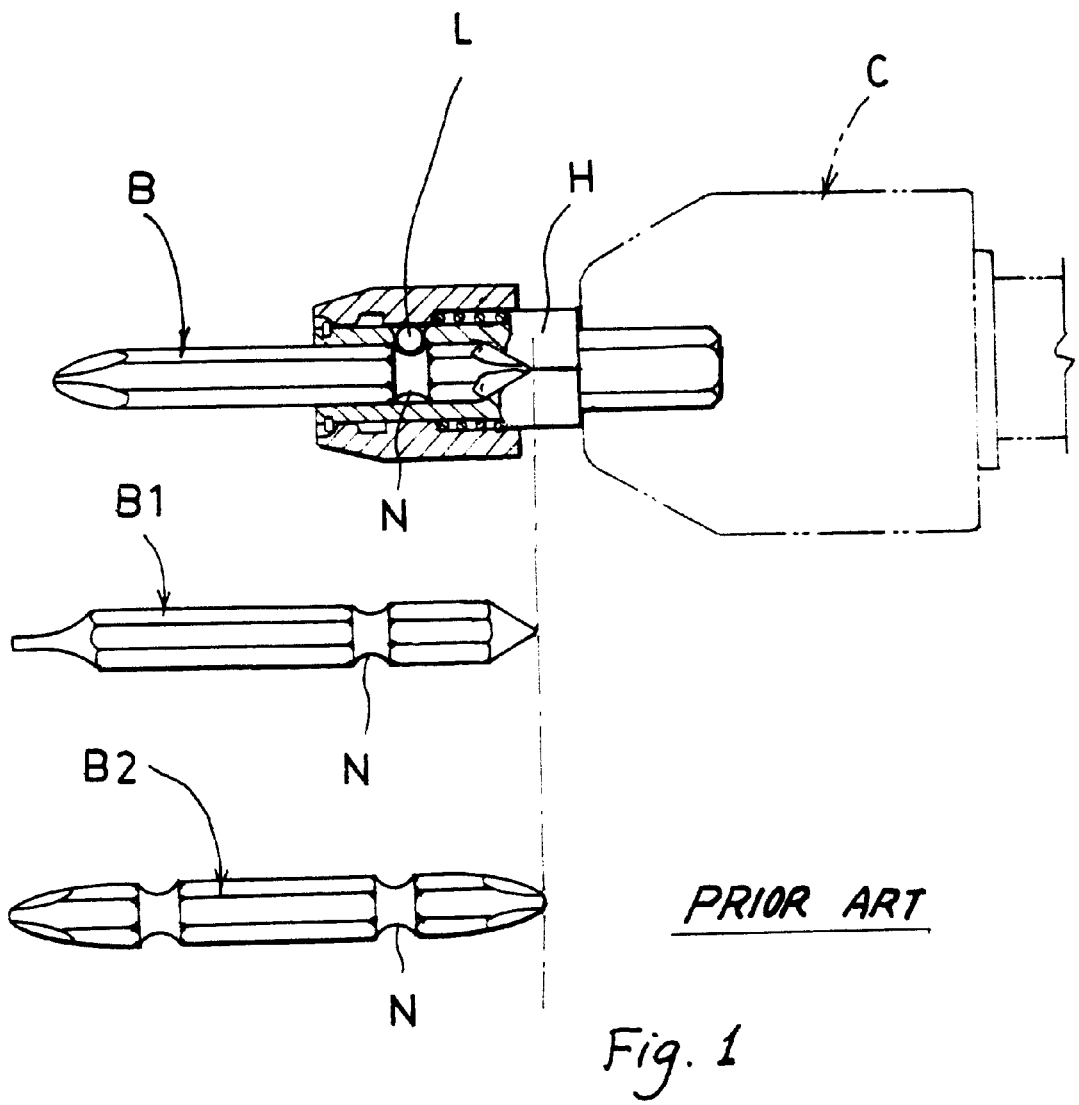
FIG. 1 is an illustration showing the coupling of a driver bit with a conventional adapter.
Figure 2:
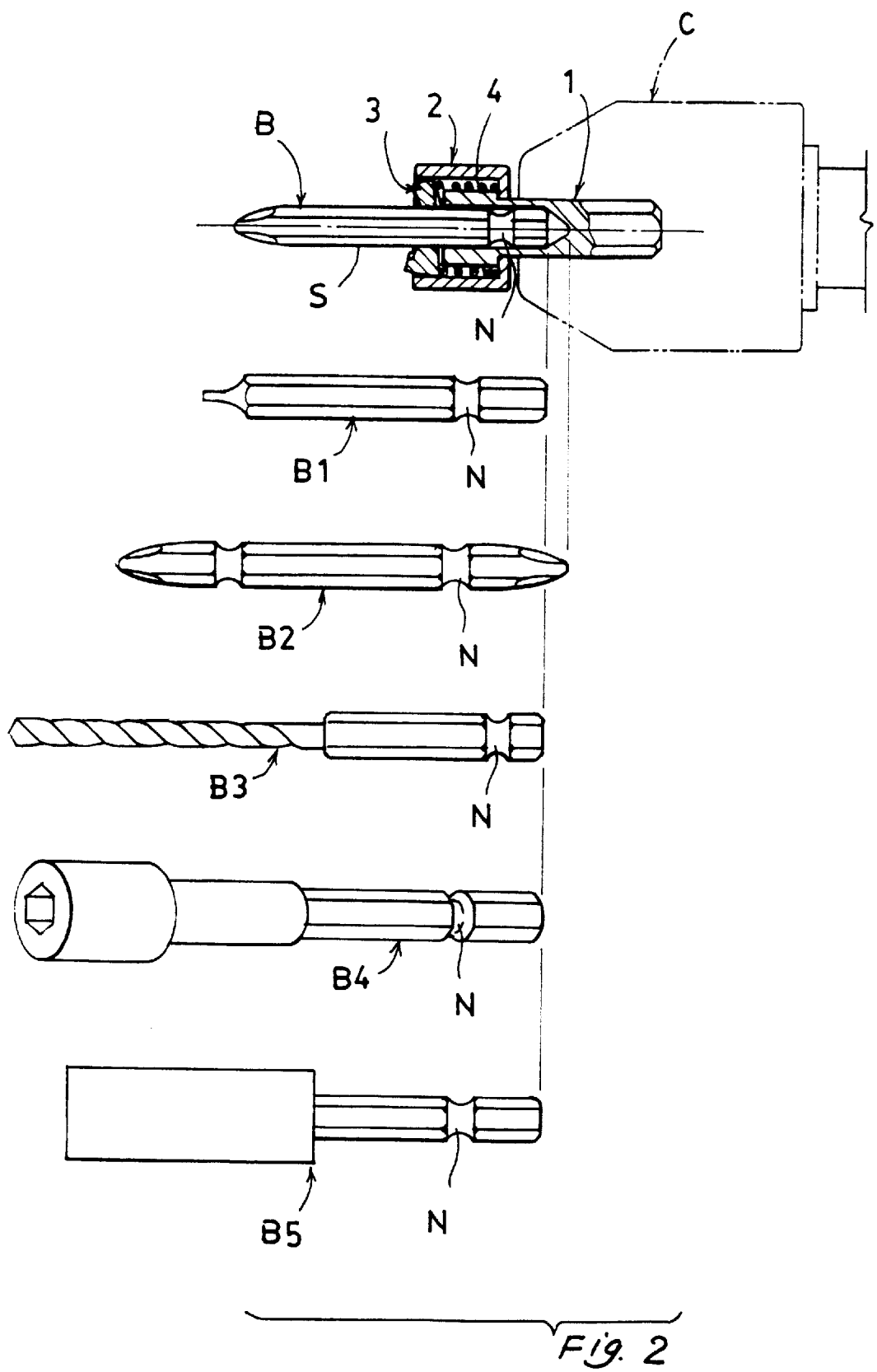
FIG. 2 shows the present invention capable of coupling a plurality of tool bits.
Figure 3:
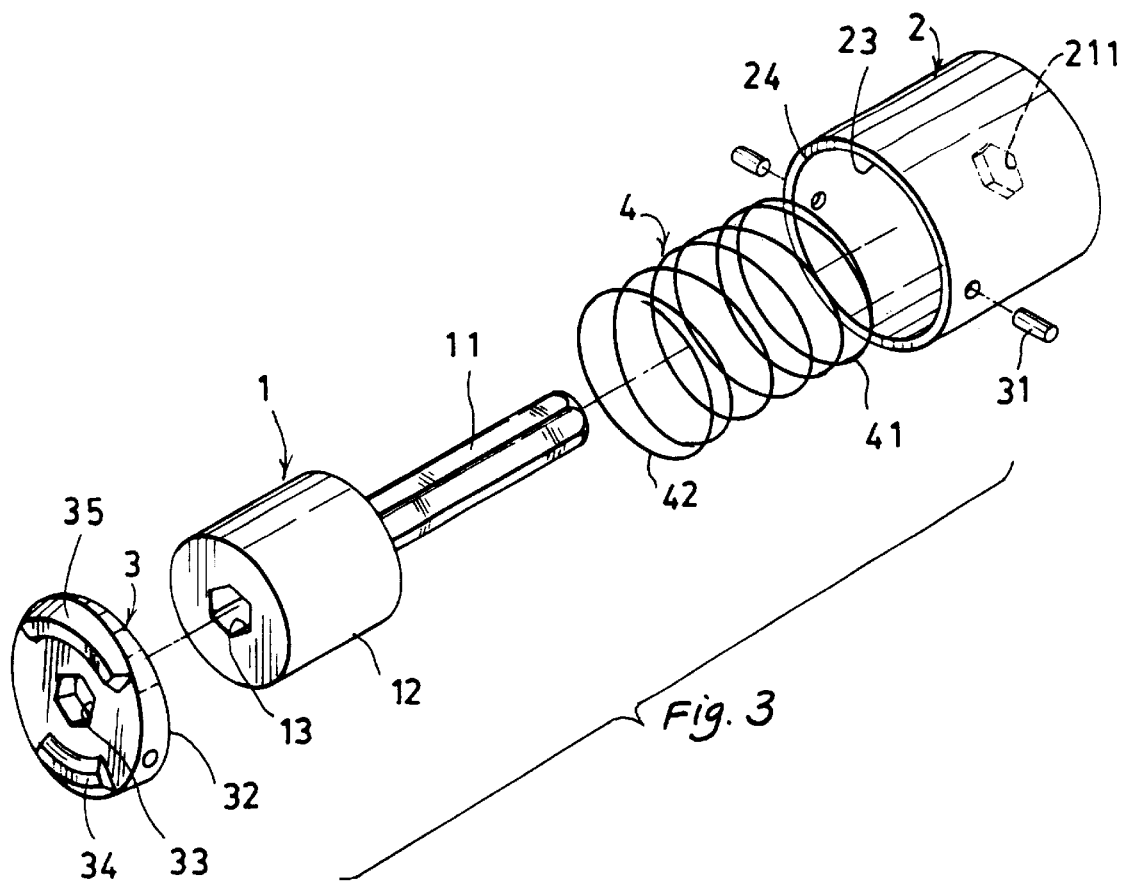
FIG. 3 is an exploded view of the present invention.
Figure 4:
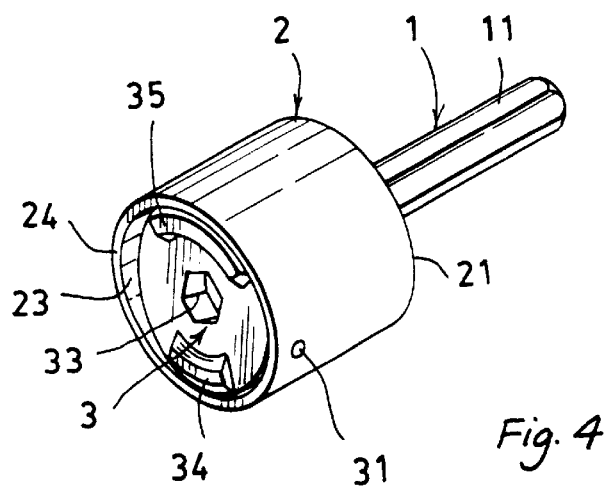
FIG. 4 is a perspective view of the present invention when assembled.

The present invention may be provided for diversified uses. As shown in FIG. 2, the bits B, B1, B2 are served for driver bits; while the bit B3 provided for a drill; the bit B4 for a pipe wrench; and bit B5 for a magnetic adapter.

Figure 8:
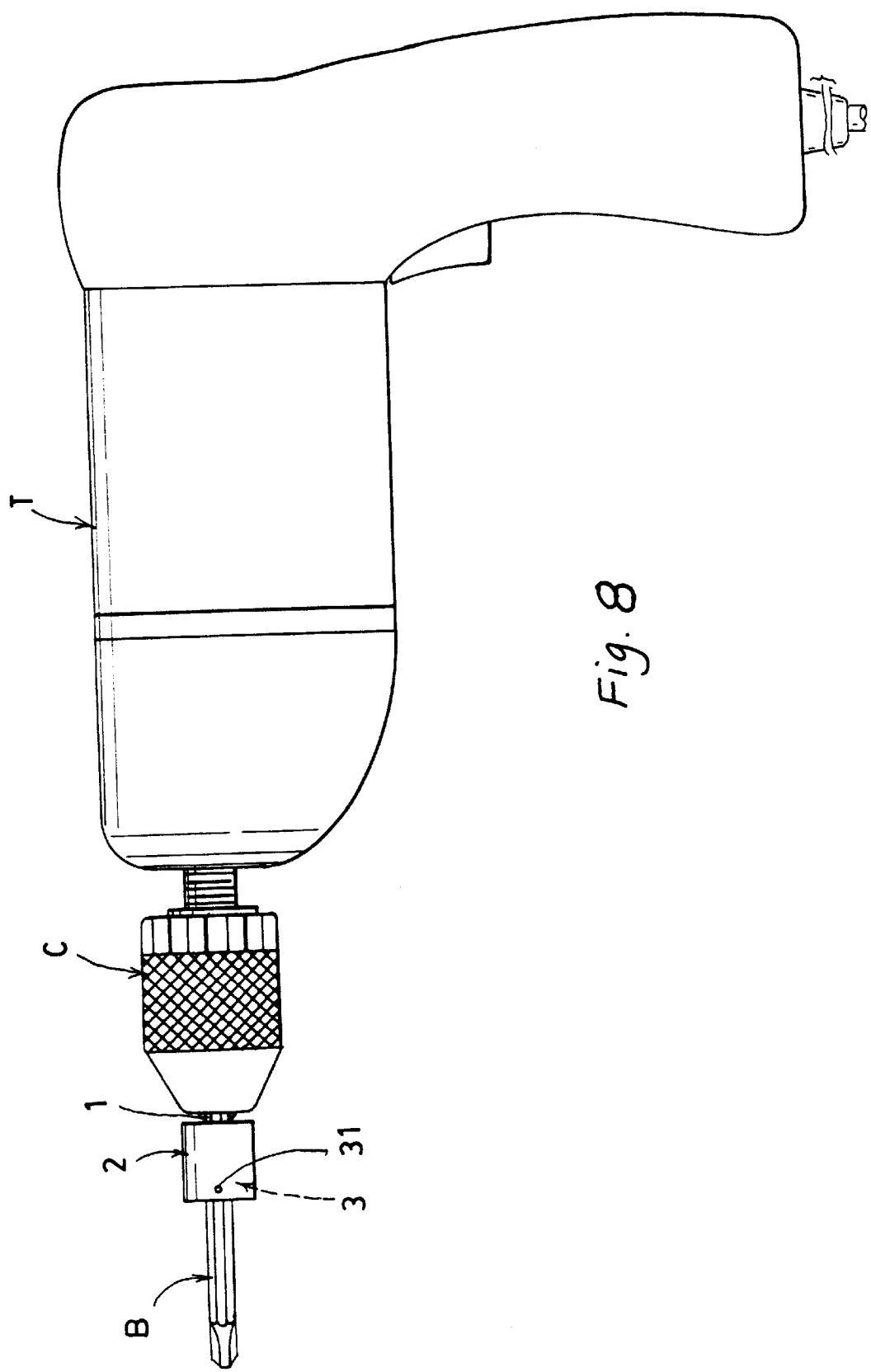
FIG. 8 shows an application of the present invention in an electrically operating tool.
Figure 9:
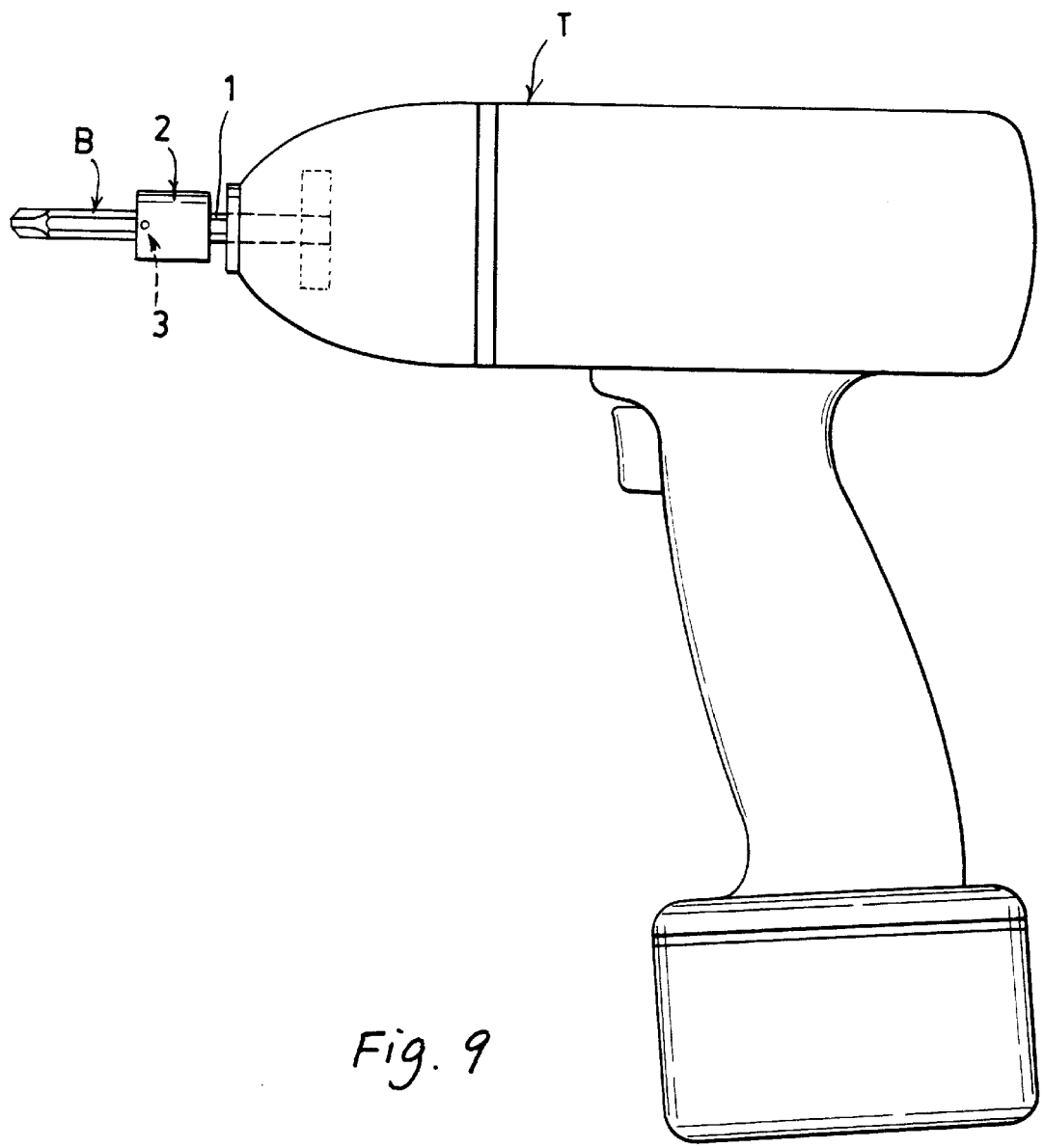
FIG. 9 is an illustration showing the application of the present invention on another tool.
Figure 10:
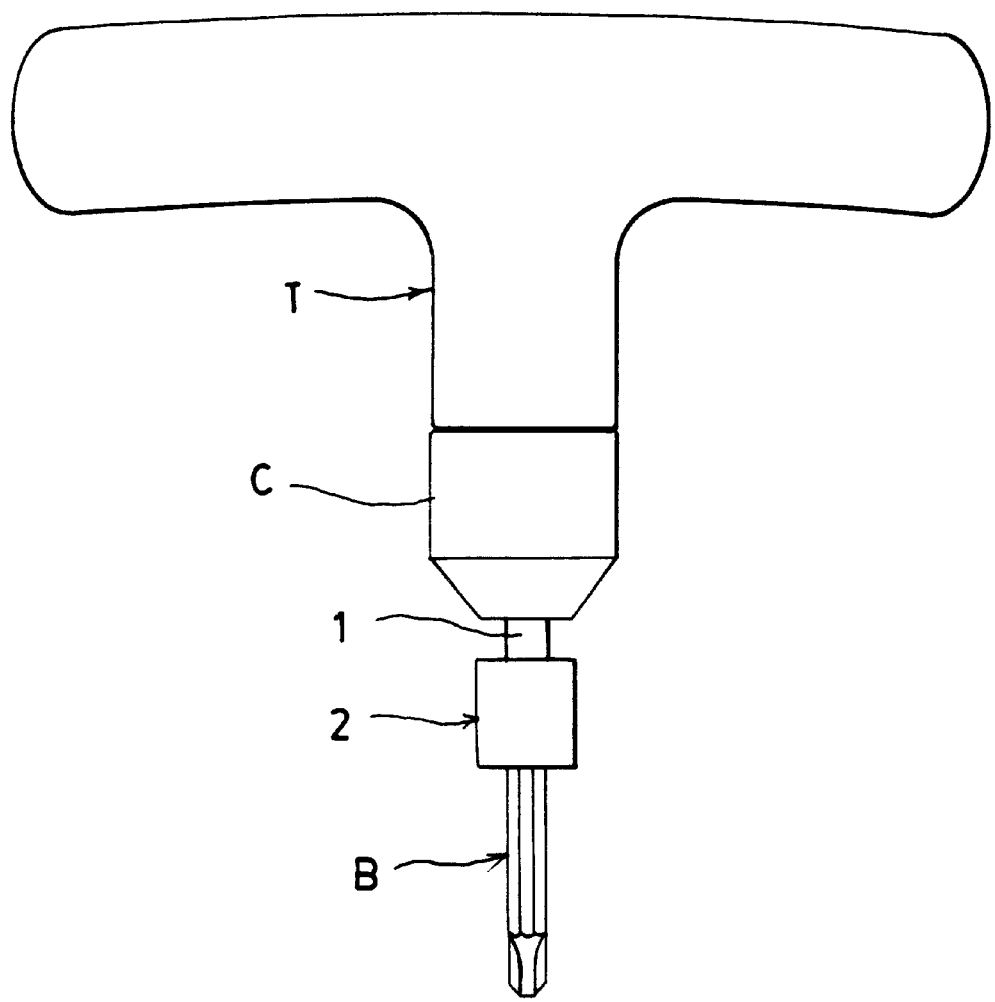
FIG. 10 shows the application of the present invention on a manual tool.
Figure 11:
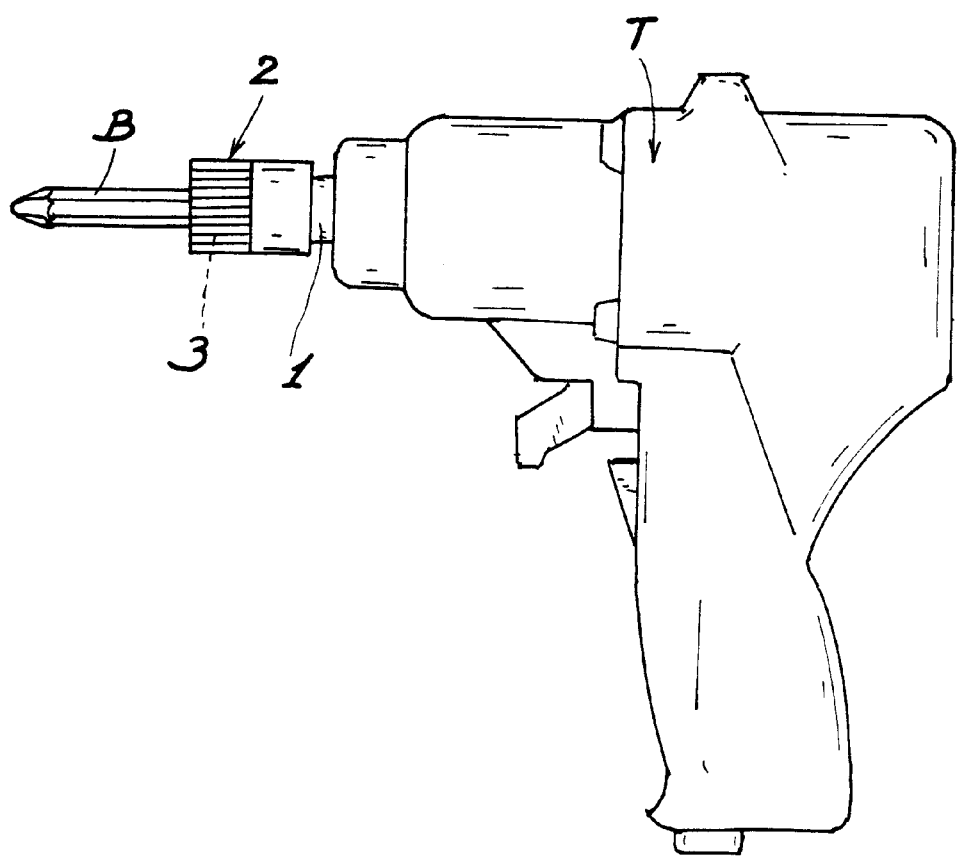
FIG. 11 shows the application on an air driver.

As shown in FIG. 8, the bit B is clamped in a chuck C of an electrically operating driver. The bit B as shown in FIG. 9 is directly secured in a spindle of a tool T. The bit B may, of course, be secured to a manually operating tool (driver) as shown in FIG. 10. The air driver to apply the present invention is shown in FIG. 11.

The present invention is superior to a conventional tool-bit adapter with the following advantages:
1. Regardless of a variety of different tool bits B having different locations of the neck portions in the bits B, each bit once being inserted into the hole of the present invention will be eccentrically biased and firmly dogged. So, the present invention provides a universal bit adapter.
2. The tool bit is firmly dogged by the edge of the hole 33 in the control member 3 when the bit is inserted through the hole 33 when the control member 3 is eccentrically biased by the tension spring 4, thereby firmly locking the bit in the adapter of the present invention.
3. Each neck portion N of the bit b is deeply inserted into a rear portion of the shank hole 13 of the adapting member 1, thereby having a long shank portion S deeply held within the adapter of this invention for enhancing an operational stability of the tool.

The present invention may be modified without departing from the spirit and scope of the present invention.

I claim:

1. A universal bit adapter comprising: an adapting member clamped in a tool having a shank hole longitudinally formed in the adapting member for inserting a tool bit into the shank hole and defining a longitudinal axis in said shank hole; a sleeve formed on a front portion of the adapting member; a control member pivotally mounted in a front portion of the sleeve having a central hole formed therein and defining an axis in the center of the central hole; and a tension spring resiliently held in the sleeve for tensioning a back portion of the control member for normally biasing the control member to allow the axis of the central hole to be eccentrically inclinedly intersected with the longitudinal axis formed in the shank hole in the adapting member for firmly dogging a shank portion of the tool bit in the central hole in the control member;

said control member including: a pivot for pivotally mounting the control member in a socket of the sleeve, a back portion formed on a rear end of the control member to be urged by the tension spring as retained in the sleeve, said central hole longitudinally formed through the control member defining said axis axially at the center of the central hole, with the axis of the central hole in the control member normally eccentrically inclinedly intersected with the longitudinal axis in the shank hole of the adapting member with an acute angle when normally urging the back portion of the control member by the tension spring, a depressing portion formed on a first peripheral portion of the front portion of the control member, and a counter-weight portion formed on a second peripheral portion of the front portion of the control member opposite to the depression portion for dynamically balancing the control member when holding the tool bit therein for a rotation about the longitudinal axis of the adapting member; with the axis in the control member operatively aligned with the longitudinal axis in the adapting member upon an inward depression on the depression portion of the control member.

2. A universal bit adapter according to claim 1, wherein said adapting member includes: a rear rod portion secured in a tool, a front holding portion formed on a front portion of the rod portion, and said shank hole longitudinally recessed in the front holding portion; and said sleeve including: a rear end plate having a central rod hole formed in the rear end plate for passing the rear rod portion of the adapting member through the central rod hole.

3. A universal bit adapter according to claim 1, wherein said central hole in the control member is formed as a shape selected from a polygonal shape and a cylindrical shape.

4. A universal bit adapter according to claim 1, wherein said back portion of the control member further includes a convex portion protruding rearwardly from a peripheral portion of the back portion opposite to the depression portion of the control member to ensure a resilient contact with the tension spring.

* * * * *